(12) United States Patent
Ramey et al.

(10) Patent No.: US 11,632,307 B2
(45) Date of Patent: Apr. 18, 2023

(54) DYNAMIC TRAP FOR SIMPLE NETWORK MANAGEMENT PROTOCOL

(71) Applicant: The Boeing Company, Chicago, IL (US)

(72) Inventors: Sean Ramey, Everett, WA (US); James Matthew Zaehring, Everett, WA (US)

(73) Assignee: The Boeing Company, Chicago, IL (US)

( * ) Notice: Subject to any disclaimer, the term of this patent is extended or adjusted under 35 U.S.C. 154(b) by 5 days.

(21) Appl. No.: 17/445,238

(22) Filed: Aug. 17, 2021

(65) Prior Publication Data

US 2022/0094608 A1    Mar. 24, 2022

Related U.S. Application Data

(60) Provisional application No. 63/082,152, filed on Sep. 23, 2020.

(51) Int. Cl.
*H04L 41/00* (2022.01)
*H04L 67/12* (2022.01)

(52) U.S. Cl.
CPC .............. *H04L 41/20* (2013.01); *H04L 67/12* (2013.01)

(58) Field of Classification Search
CPC .............................. H04L 41/20; H04L 67/12
See application file for complete search history.

(56) References Cited

U.S. PATENT DOCUMENTS

2011/0176617 A1* 7/2011 Fagan ................. H04L 67/2823
375/259
2017/0331895 A1* 11/2017 Manjunath .............. H04L 12/40

* cited by examiner

*Primary Examiner* — Normin Abedin
(74) *Attorney, Agent, or Firm* — Yee & Associates, P.C.

(57) ABSTRACT

A method and apparatus for managing a managed device on a network. An agent is run on the managed device. During runtime of the agent on the managed device, the agent receives dynamic trap parameter update values from network management station software running on a manager computer. The agent uses the dynamic trap parameter update values to set dynamic trap parameter values including trigger parameter values defining conditions for sending a dynamic trap. After setting the dynamic trap parameter values, the agent monitors the managed device to identify occurrence of an event that satisfies the conditions defined by the trigger parameter values. In response to identifying the occurrence of the event, the agent sends the dynamic trap to the network management station software running on the manager computer.

20 Claims, 3 Drawing Sheets

DYNAMIC TRAP FOR SIMPLE NETWORK MANAGEMENT PROTOCOL

RELATED PROVISIONAL APPLICATION

This application is related to and claims the benefit of priority of provisional U.S. Patent Application Ser. No. 63/082,152, entitled "Dynamic Trap for Simple Network Management Protocol", filed on Sep. 23, 2020, which is hereby incorporated by reference.

BACKGROUND INFORMATION

1. Field

The present disclosure relates generally to Simple Network Management Protocol, SNMP, for monitoring or managing devices on a network and to traps for sending notifications from an agent running on a managed device on the network to a manager computer in response to the occurrence of an event without being requested by the manager. More particularly, the present disclosure relates to a dynamic trap in SNMP in which parameter values that define the conditions for triggering the sending of the dynamic trap from an agent running on a managed device to a manager computer in response to an event may be set or changed during runtime of the agent on the managed network device.

2. Background

Simple Network Management Protocol, SNMP, is a protocol for managing devices on a network by collecting information about the devices to monitor the devices and modifying information on the devices to change device behavior. Examples of network devices that typically may be managed using SNMP include cable modems, routers, switches, servers, workstations, printers, and other devices.

In typical uses of SNMP, one or more computers operate as managers to manage a group of managed devices on a network. Each managed device executes a software component called an agent. Each agent reports information for a managed device to the manager in response to requests from the manager and may receive requests to change information on a managed device from the manager.

SNMP also provides for sending a trap from an agent running on a managed device to the manager. The trap is an asynchronous notification that is sent from an agent to the manager in response to an event in the managed device without being requested by the manager. In other SNMP communications between the manager and the agents, the manager actively requests information from the agent. In contrast, a trap message is sent from an agent to the manager without being explicitly requested. SNMP traps enable an agent to notify the manager of significant events by way of an unsolicited SNMP message.

The conditions in the managed device that trigger the sending of a trap from an agent to the manager are defined at design time and compiled into the program code for the agent in the managed device. The trigger conditions for the sending of a trap by an agent currently cannot be changed without updating the agent software in the managed device. Therefore, current uses of SNMP traps are typically limited to notifying the manager of relatively broad and unchanging events in a managed device, such as device startup and shutdown.

Therefore, there is a need for a method and apparatus that take into account at least some of the issues discussed above, as well as other possible issues.

SUMMARY

Illustrative embodiments provide a method of managing a managed device on a network including running an agent on the managed device. During runtime of the agent on the managed device, the agent receives dynamic trap parameter update values from network management station software running on a manager computer. The agent uses the dynamic trap parameter update values to set dynamic trap parameter values including trigger parameter values defining conditions for sending a dynamic trap. After setting the dynamic trap parameter values, the agent monitors the managed device to identify occurrence of an event that satisfies the conditions defined by the trigger parameter values. In response to identifying the occurrence of the event, the agent sends the dynamic trap to the network management station software running on the manager computer.

Illustrative embodiments also provide a method of managing a managed device on a network including running network management station software on a manager computer. During runtime, the network management station software running on the manager computer sends dynamic trap parameter update values from the network management station software running on the manager computer to an agent running on the managed device. The dynamic trap parameter update values define dynamic trap parameter values including trigger parameter values defining conditions for sending a dynamic trap from the agent running on the managed device to the network management station software running on the manager device.

Illustrative embodiments also provide an apparatus for managing a managed device on a network including an agent running on the managed device. The agent is configured to, during runtime of the agent on the managed device: receive dynamic trap parameter update values from network management station software running on a manager computer, use the dynamic trap parameter update values to set dynamic trap parameter values including trigger parameter values defining conditions for sending a dynamic trap, after setting the dynamic trap parameter values, monitor the managed device to identify occurrence of an event that satisfies the conditions defined by the trigger parameter values, and, in response to identifying the occurrence of the event, send the dynamic trap to the network management station software running on the manager computer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that currently the events that trigger the sending of a trap in a network of devices that are managed using SNMP are statically defined in compiled program code. The conditions that trigger the sending of a trap thus cannot be changed without changing the agent software in a managed device. This limits the usefulness of traps as currently implemented in SNMP.

The illustrative embodiments also recognize and take into account that it is desirable to monitor various changing conditions in a network of devices in order to manage the devices in the network effectively and efficiently. Information for monitoring such conditions may be gathered by repeated polling of information from managed devices by a manager using SNMP requests for information from the managed devices. However, such repeated polling of information may require undesirably large bandwidth and processing power in the nodes of the network.

Illustrative embodiments provide dynamic traps for managing a network of devices using SNMP. In accordance with illustrative embodiments, an agent running on a managed device may send a dynamic trap notification to a manager without receiving a request from the manager. Unlike conventional SNMP traps, however, the conditions that trigger the sending of a dynamic trap may be redefined at runtime. By providing for the changing of the trigger conditions at runtime the usefulness of dynamic traps for providing information to the manager is improved over conventional SNMP traps.

Dynamic traps in accordance with illustrative embodiments may be used for gathering more useful information for network monitoring and management than convention SNMP traps. The improved usefulness of dynamic traps allows the use of traps to be expanded in various fields of technology such as, without limitation, Internet of things in Avionics, artificial intelligence analyzed prognostics, and other appropriate applications.

The communication of information from agents in managed devices to a manager using dynamic traps requires less bandwidth and processing power than polling information from managed devices by requesting information from agents by the manager. Therefore, the use of dynamic traps in accordance with an illustrative embodiment may reduce the processing resources required for the monitoring and management of networks of devices.

Figure 1:
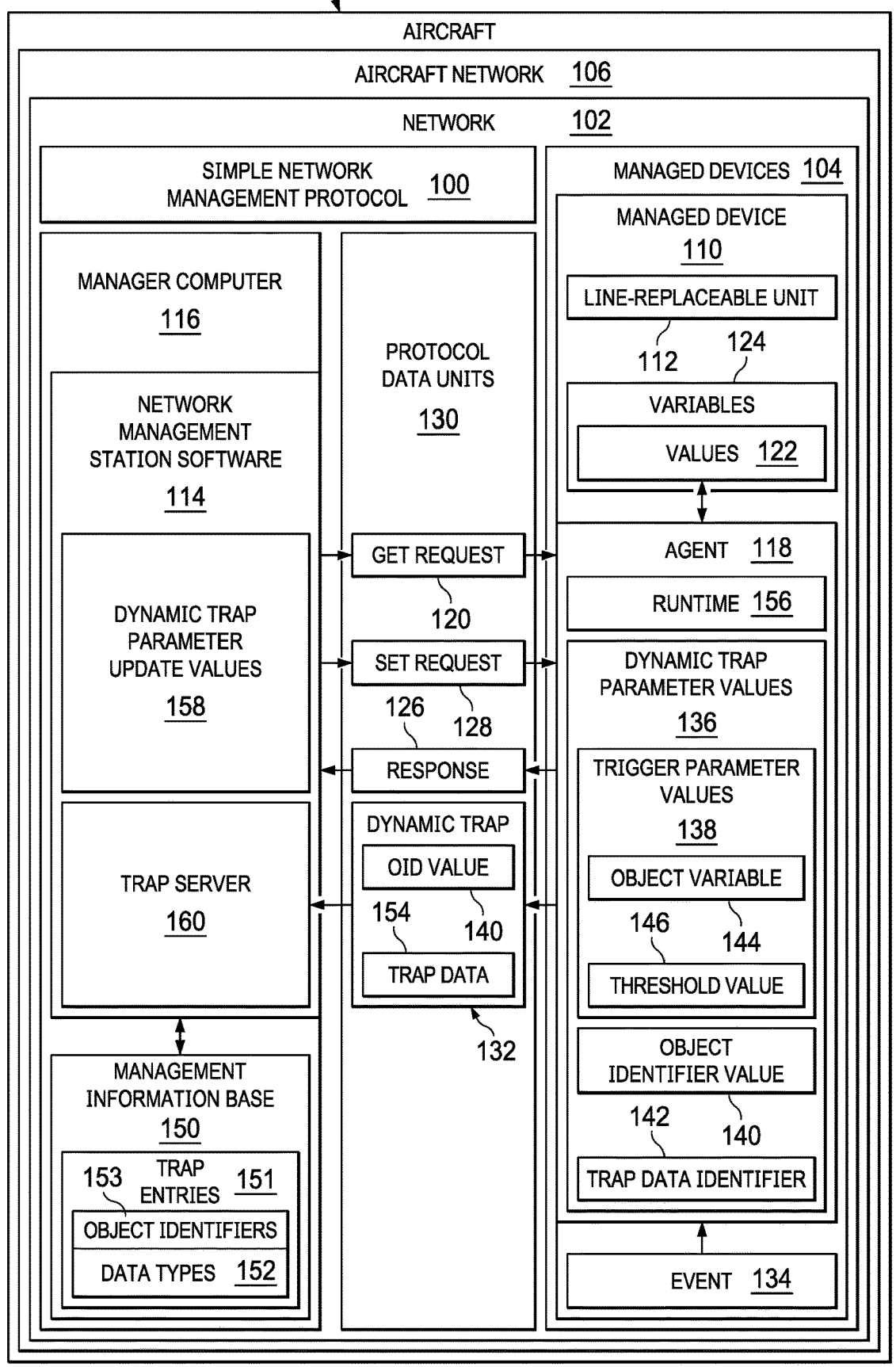
FIG. 1 is an illustration of a block diagram of a network of devices that are managed using Simple Network Management Protocol including dynamic traps in accordance with an illustrative embodiment.

Turning to FIG. 1, an illustration of a block diagram of a network of devices that are managed using Simple Network Management Protocol including dynamic traps is depicted in accordance with an illustrative embodiment. Illustrative embodiments are based on Simple Network Management Protocol 100 and may be implemented by modifying any appropriate known version of Simple Network Management Protocol 100 to implement the functionality of dynamic traps as described herein.

Illustrative embodiments may be used for the monitoring and management of network 102 of managed devices 104. Network 102 may comprise any appropriate network of any appropriate number of managed devices 104. For example, without limitation, network 102 may be aircraft network 106 on aircraft 108. In this example, managed device 110 in managed devices 104 may include line-replaceable unit 112 on aircraft 108.

Aircraft 108 may comprise any appropriate type of aircraft that may be configured to perform any appropriate operation or missions. For example, without limitation, aircraft 108 may be a commercial passenger aircraft, a cargo aircraft, a military aircraft, or any other appropriate type of aircraft. Aircraft 108 may be a fixed wing, rotary wing, or lighter than air aircraft. Furthermore, aircraft 108 may be a manned aircraft or an unmanned aircraft that is operated by remote control.

Simple Network Management Protocol 100 may be implemented in network 102 by network management station software 114 running on manager computer 116 and agent 118 running on each managed device 110 in network 102. In the example where network 102 is aircraft network 106, manager computer 116 may be located onboard aircraft 108. Alternatively, some or all of the functionality of manager computer 116 may be implemented at a location off of aircraft 108. For example, without limitation, manager computer 116 may be implemented at a ground station in communication with managed devices 104 onboard aircraft 108.

Network management station software 114 running on manager computer 116 may send get request 120 to agent 118 to request values 122 of any appropriate variables 124 in managed device 110. The requested values 122 of variables 124 are sent back to manager computer 116 from agent 118 in response 126. Network management station software 114 also may be configured to send set request 128 to agent 118 to set or change any appropriate values 122 of variables 124 in managed device 110. Get request 120, set request 128, and response 126 may be implemented as structured protocol data units 130 in accordance with Simple Network Management Protocol 100.

Agent 118 is configured to send dynamic trap 132 to manager computer 116 in response to the occurrence of event 134 in managed device 110 using dynamic trap parameter values 136. Dynamic trap is thus a notification to manager computer 116 that event 134 has occurred in managed device 110.

Dynamic trap parameter values 136 may include trigger parameter values 138, object identifier value 140, and trap data identifier 142. Trigger parameter values 138 may include any appropriate values that define event 134 in managed device 110 that triggers the sending of dynamic trap 132. For example, without limitation, trigger parameter values 138 may include object variable 144 and threshold value 146. Object variable 144 may identify one or more variables 124 in managed device to be monitored by agent 118. The sending of dynamic trap 132 by agent 118 is triggered in response to values 122 of the one or more variables 124 identified by object variable 144 meeting threshold value 146.

Management information base 150 defines types of data, such as counters, strings, and the like. In accordance with an illustrative embodiment, management information base 150 may include trap entries 151. Trap entries 151 may include data types 152 matched to corresponding object identifiers 153 for dynamic traps.

Object identifier value 140 may be included in dynamic trap 132 sent from agent 118 to manager computer 116. Object identifier value 140 in dynamic trap 132 may be used by manager computer 116 to retrieve data types 152 from management information base 150 in response to receiving dynamic trap 132.

Trap identifier 142 identifies trap data 154 that may be included in dynamic trap 132 sent from agent 118 to manager computer 116. For example, without limitation, trap data identifier 142 may identify trap data 154 regarding event 134 that triggered the sending of dynamic trap 132 to be included in dynamic trap 132.

In accordance with an illustrative embodiment, any one or more of dynamic trap parameter values 136 may be changed during runtime 156 of agent 118 on managed device 110. For example, network management station software 114 running on manager computer 116 may be configured to send dynamic trap parameter update values 158 to agent 118 during runtime 156. For example, without limitation, dynamic trap parameter update values 158 may be sent to agent 118 using set request 128, one or more other appropriate protocol data units 130, or in any other appropriate manner. Agent 118 uses the received dynamic trap parameter update values 158 to set dynamic trap parameter values 136 that are used by agent 118 to send dynamic trap 132 during runtime 156.

Dynamic trap parameter values 136 defining dynamic trap 132 may or may not be retained by agent 118 through a power cycle. For example, whether or not dynamic trap parameter values 136 are retained by agent 118 when managed device 110 is powered down may be determined by default. Alternatively, whether or not dynamic trap parameter values 136 are retained through a power cycle may be user selectable. For example, without limitation, whether or not dynamic trap parameter values 136 are retained may be defined by a parameter in set request 128 or in another appropriate manner.

Network management station software 114 running on manager computer 116 may implement trap server 160. Trap server 160 may be configured to receive and process dynamic trap 132 received from agent 118 to implement any appropriate action. For example, without limitation, trap server 160 may be configured to generate a warning, display information, perform an analysis, or perform any other appropriate action or various combinations of actions in response to receiving dynamic trap 132. In another example embodiment, the response to receiving dynamic trap 132 may include a live update of trap entries 151 listed within management information base 150 stored on manager computer 116.

The illustration of network 102 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

For example, in accordance with an illustrative embodiment, agent 118 may be configured to send a plurality of different dynamic traps, defined by different dynamic trap parameter values 136. Multiple dynamic traps may be implemented in agent 118 in any appropriate manner. For example, without limitation, multiple dynamic traps may be defined by dynamic trap parameter values 136 stored in a queue, wherein the dynamic trap parameter values 136 for the oldest defined dynamic trap in the queue is overwritten when the allocated queue space is full and a new dynamic trap is to be defined. As another example, multiple specific addressable buffers may be allocated for multiple sets of dynamic trap parameter values 136 and overwritten to change one or more dynamic traps or define one or more new dynamic traps.

In another illustrative embodiment, network management station software 114 running on manager computer 116 may be configured to read dynamic trap parameter values 136 for one or more dynamic traps from agent 118. For example, network management station software 114 running on manager computer 116 may be configured to get a list of any currently set dynamic traps and the corresponding dynamic trap parameter values 136 from agent 118. For example, without limitation, this information may be requested in a get request 120 sent to agent 118 and the requested information may be provided in a response 126 from agent 118 to network management station software 114 running on manager computer 116. In a further example embodiment, dynamic trap parameter values 136 read from one agent by network management station software 114 running on manager computer 116 may be used as dynamic trap parameter update values 158 to define a dynamic trap on another agent.

Figure 2:
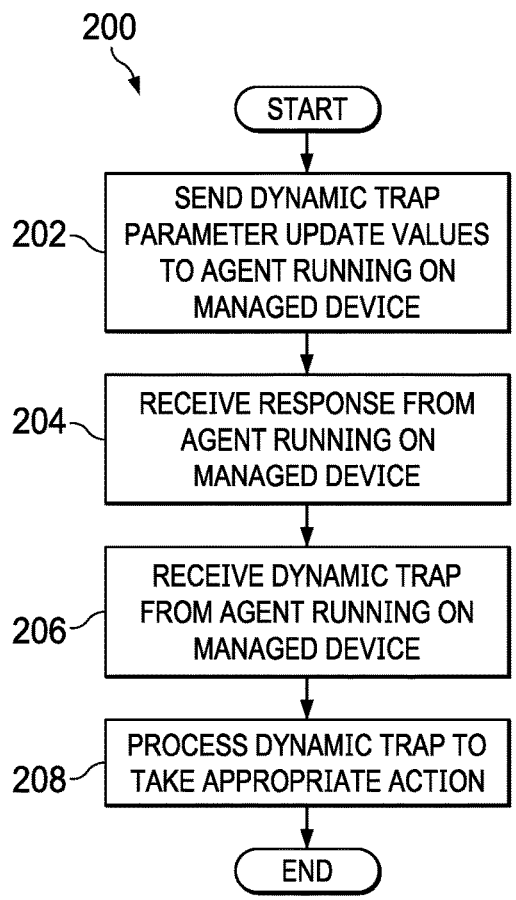
FIG. 2 is an illustration of a flowchart of a process for managing devices in a network using dynamic traps in accordance with an illustrative embodiment.

Turning to FIG. 2, an illustration of a flowchart of a process for managing devices in a network using dynamic traps is depicted in accordance with an illustrative embodiment. Process 200 may be implemented, for example, in network management station software 114 running on manager computer 116 in network 102 in FIG. 1.

Process 200 begins with sending dynamic trap parameter update values to an agent running on a managed device (operation 202). A response acknowledging receipt of the dynamic trap parameter update values by the agent may be received (operation 204). A dynamic trap indicating the occurrence of an event in the managed device may be received from the agent running on the managed device (operation 206).

The dynamic trap received from the agent may be processed to take appropriate action (operation 208), with the process terminating thereafter. Operation 208 may include sending a set request to the agent to set or change values of variables in the managed device. With a live edit of the management information base by the network management station software, trap protocol data unit formatting could then be used for the actual event notification by the agent. Alternative methods may not use the trap protocol data unit. For example, an unsolicited get response may be used. Illustrative embodiments are not limited to any particular response to a dynamic trap.

Figure 3:
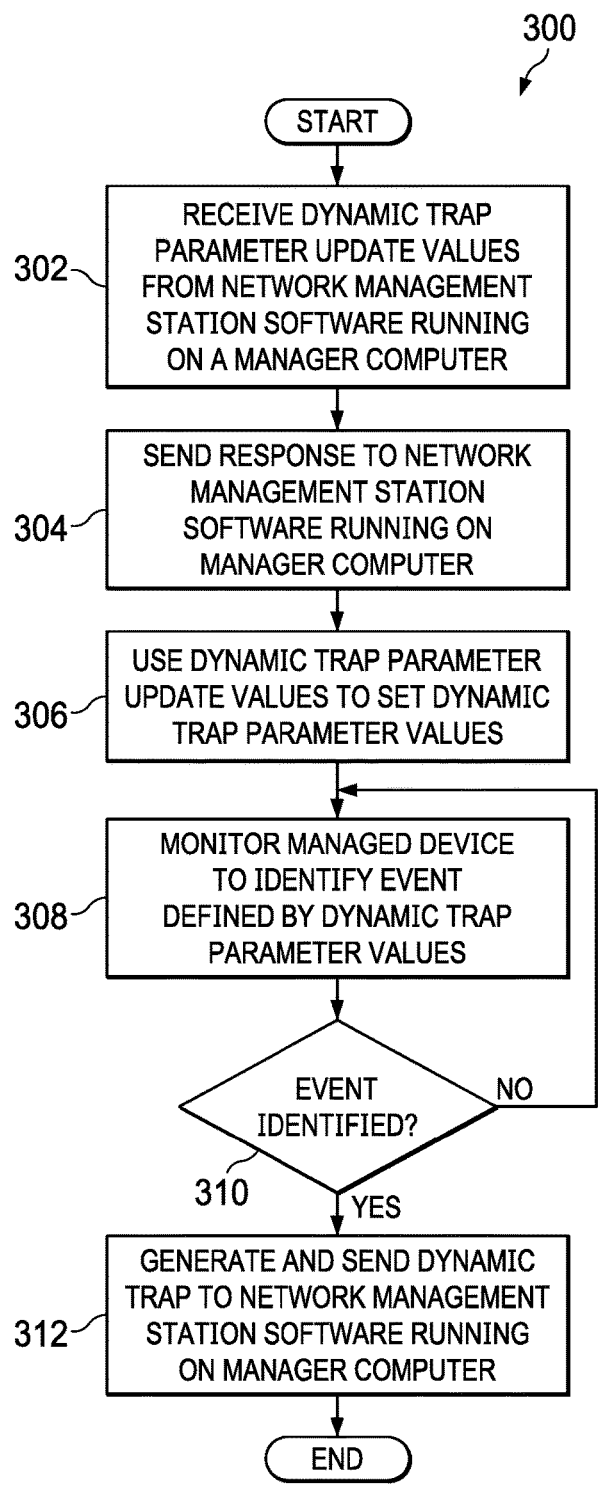
FIG. 3 is an illustration of a flowchart of another embodiment of a process for managing devices in a network using dynamic traps in accordance with an illustrative embodiment.

Turning to FIG. 3, an illustration of a flowchart of another embodiment of a process for managing devices in a network using dynamic traps is depicted in accordance with an illustrative embodiment. Process 300 may be implemented, for example, in agent 118 running on managed device 110 in network 102 in FIG. 1.

Process 300 begins with receiving dynamic trap parameter update values from network management station software running on a manager computer (operation 302). A response may be sent back to the network management station software running on the manager computer to acknowledge receipt of the dynamic trap parameter update values (operation 304). The received dynamic trap parameter update values are used to set dynamic trap parameter values (operation 306).

The managed device is monitored to identify the occurrence of an event that is defined by the dynamic trap parameter values (operation 308). It is determined whether an event as defined by the dynamic trap parameter values is identified (operation 310). In response to a determination at operation 310 that an event is not identified, the process returns to operation 308 and monitoring of the managed device continues. In response to a determination at operation 310 that an event is identified, a dynamic trap is generated and sent to the network management station software running on the manager computer (operation 312), with the process terminating thereafter.

Figure 4:
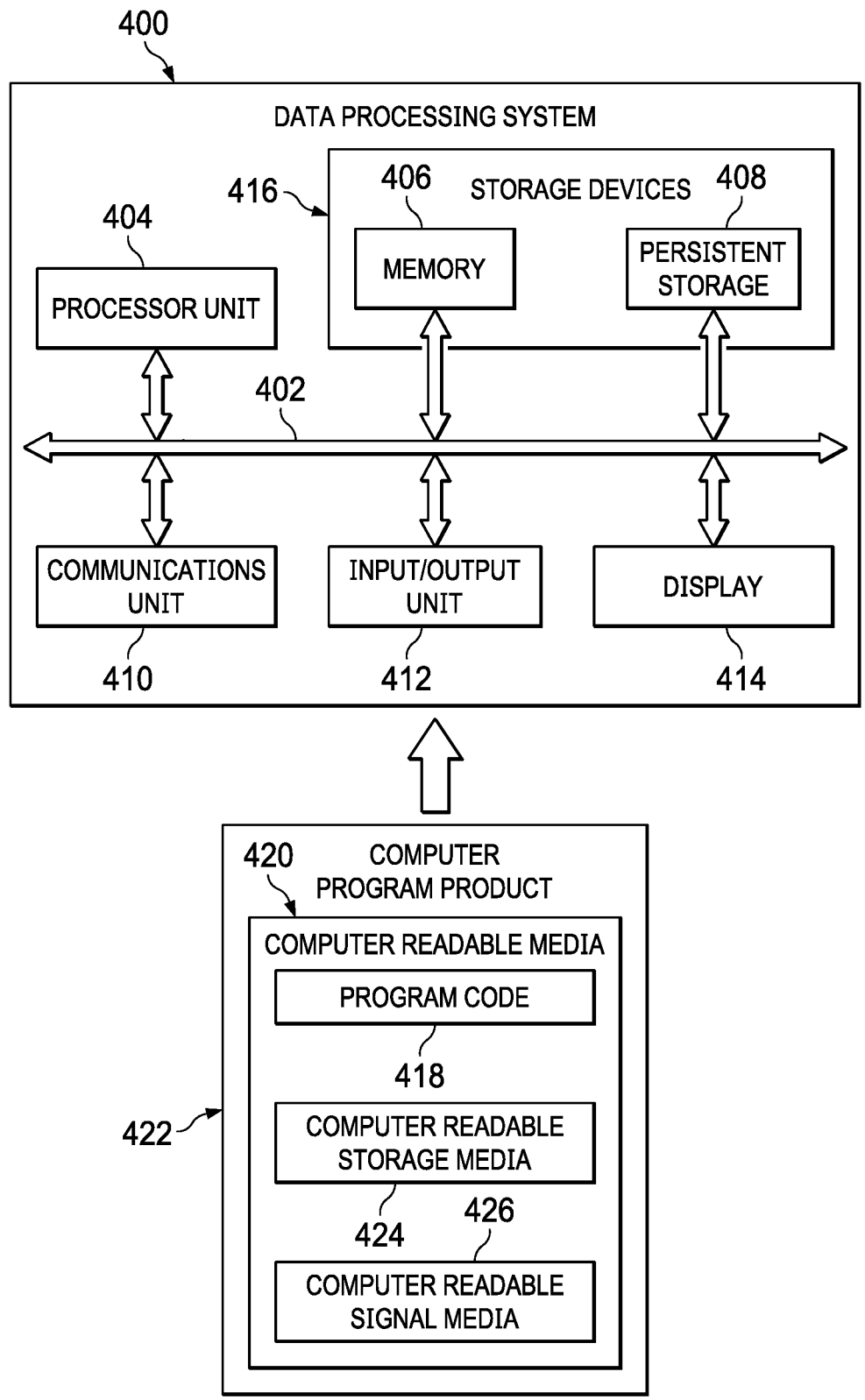
FIG. 4 is an illustration of a block diagram of a data processing system in accordance with an illustrative embodiment.

Turning to FIG. 4, an illustration of a block diagram of a data processing system is depicted in accordance with an illustrative embodiment. Data processing system 400 is an example of one possible implementation of a data processing system for performing the functions of managing a network of devices using dynamic traps as described herein. For example, without limitation, data processing system 400 is an example of one possible implementation of manager computer 116 or managed device 110 in FIG. 1.

In this illustrative example, data processing system 400 includes communications fabric 402. Communications fabric 402 provides communications between processor unit 404, memory 406, persistent storage 408, communications unit 410, input/output (I/O) unit 412, and display 414. Memory 406, persistent storage 408, communications unit 410, input/output (I/O) unit 412, and display 414 are examples of resources accessible by processor unit 404 via communications fabric 402.

Processor unit 404 serves to run instructions for software that may be loaded into memory 406. Processor unit 404 may be a number of processors, a multi-processor core, or some other type of processor, depending on the particular implementation. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and other suitable information either on a temporary basis or a permanent basis. Storage devices 416 also may be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output (I/O) unit 412 allows for input and output of data with other devices that may be connected to data processing system 400. For example, input/output (I/O) unit 412 may provide a connection for user input through a keyboard, a mouse, and/or some other suitable input device. Further, input/output (I/O) unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer-implemented instructions, which may be located in a memory, such as memory 406.

These instructions are referred to as program instructions, program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 722 in these examples. In one example, computer readable media 420 may be computer readable storage media 424 or computer readable signal media 426.

Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400.

In these examples, computer readable storage media 424 is a physical or tangible storage device used to store program code 418 rather than a medium that propagates or transmits program code 418. Computer readable storage media 424 is also referred to as a computer readable tangible storage device or a computer readable physical storage device. In other words, computer readable storage media 424 is a media that can be touched by a person.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to and/or in place of those illustrated for data processing system 400. Other components shown in FIG. 4 can be varied from the illustrative examples shown. The different embodiments may be implemented using any hardware device or system capable of running program code. As one example, data processing system 400 may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 418 may be omitted, because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system.

Additionally, communications unit 410 may include a number of devices that transmit data, receive data, or both transmit and receive data. Communications unit 410 may be, for example, a modem or a network adapter, two network adapters, or some combination thereof. Further, a memory may be, for example, memory 406, or a cache, such as that found in an interface and memory controller hub that may be present in communications fabric 402.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of managing a managed device on a network, comprising:
running an agent on the managed device; and
during runtime of the agent on the managed device:
receiving, by the agent, dynamic trap parameter update values from network management station software running on a manager computer,
using the dynamic trap parameter update values by the agent to set dynamic trap parameter values including trigger parameter values defining conditions for sending a dynamic trap,
after setting the dynamic trap parameter values, monitoring the managed device by the agent to identify occurrence of an event that satisfies the conditions defined by the trigger parameter values, and
in response to identifying the occurrence of the event, sending the dynamic trap by the agent to the network management station software running on the manager computer.

2. The method of claim 1, wherein the agent and the network management station software are configured to implement a Simple Network Management Protocol for managing the managed device on the network.

3. The method of claim 2, wherein the dynamic trap parameter update values are identified in a protocol data unit received by the agent from the network management station software running on the manager computer.

4. The method of claim 2, wherein:
the dynamic trap parameter values set by the agent using the dynamic trap parameter update values further comprise an object identifier value for identifying data in a management information base or a trap data identifier for identifying trap data comprising information regarding the event; and the dynamic trap sent by the agent to the network management station software running on the manager computer includes the object identifier value or the trap data.

5. The method of claim 1 further comprising sending a response from the agent to the network management station software running on the manager computer to acknowledge receiving the dynamic trap parameter update values by the agent.

6. The method of claim 1, wherein the trigger parameter values identify:
an object variable in the managed device to be monitored by the agent during runtime; and
a threshold value identifying a value of the object variable at which sending of the dynamic trap by the agent is triggered.

7. The method of claim 1, wherein the network is an aircraft network on an aircraft and the managed device is a line-replaceable unit on the aircraft.

8. A method of managing a managed device on a network, comprising:
running network management station software on a manager computer; and
during runtime of the network management station software running on the manager computer, sending dynamic trap parameter update values from the network management station software running on the manager computer to an agent running on the managed device, wherein the dynamic trap parameter update values define dynamic trap parameter values including trigger parameter values defining conditions for sending a dynamic trap from the agent running on the managed device to the network management station software running on the manager computer.

9. The method of claim 8, wherein the agent and the network management station software are configured to implement a Simple Network Management Protocol for managing the managed device on the network.

10. The method of claim 9, wherein the dynamic trap parameter update values are identified in a protocol data unit sent from the network management station software running on the manager computer to the agent running on the managed device.

11. The method of claim 8 further comprising receiving a response by the network management station software running on the manager computer from the agent running on the managed device, wherein the response acknowledges receiving of the dynamic trap parameter update values by the agent.

12. The method of claim 8, wherein the trigger parameter values identify:
an object variable in the managed device to be monitored by the agent running on the managed device; and
a threshold value identifying a value of the object variable at which sending of the dynamic trap by the agent is triggered.

13. The method of claim 8 further comprising receiving, by the network management station software running on the manager computer, the dynamic trap sent from the agent running on the managed device.

14. The method of claim 8, wherein the network is an aircraft network on an aircraft and the managed device is a line-replaceable unit on the aircraft.

15. An apparatus for managing a managed device on a network, comprising:
an agent running on the managed device, wherein the agent is configured to, during runtime of the agent on the managed device:
receive dynamic trap parameter update values from network management station software running on a manager computer,
use the dynamic trap parameter update values to set dynamic trap parameter values including trigger parameter values defining conditions for sending a dynamic trap,
after setting the dynamic trap parameter values, monitor the managed device to identify occurrence of an event that satisfies the conditions defined by the trigger parameter values, and
in response to identifying the occurrence of the event, send the dynamic trap to the network management station software running on the manager computer.

16. The apparatus of claim 15, wherein the agent and the network management station software are configured to implement a Simple Network Management Protocol for managing the managed device on the network.

17. The apparatus of claim 16, wherein the dynamic trap parameter update values are identified in a protocol data unit received by the agent from the network management station software running on the manager computer.

18. The apparatus of claim 16, wherein:
the dynamic trap parameter values set by the agent using the dynamic trap parameter update values further comprise an object identifier value for identifying data in a management information base or a trap data identifier for identifying trap data comprising information regarding the event; and
the dynamic trap sent by the agent to the network management station software running on the manager computer includes the object identifier value or the trap data.

19. The apparatus of claim 15, wherein the trigger parameter values identify:
an object variable in the managed device to be monitored by the agent during runtime; and
a threshold value identifying a value of the object variable at which sending of the dynamic trap by the agent is triggered.

20. The apparatus of claim 15, wherein the network is an aircraft network on an aircraft and the managed device is a line-replaceable unit on the aircraft.

* * * * *